United States Patent
Rae et al.

(10) Patent No.: US 9,137,574 B2
(45) Date of Patent: Sep. 15, 2015

(54) METHOD OR SYSTEM TO PREDICT MEDIA CONTENT PREFERENCES

(75) Inventors: Adam Rae, Milton Keynes (GB); Lluis Garcia Pueyo, Sant Cugat Del Valles (ES); Roelof van Zwol, Catalunya (ES)

(73) Assignee: Yahoo! Inc., Sunnyvale, CA (US)

( * ) Notice: Subject to any disclaimer, the term of this patent is extended or adjusted under 35 U.S.C. 154(b) by 652 days.

(21) Appl. No.: 12/845,684

(22) Filed: Jul. 28, 2010

(65) Prior Publication Data

US 2012/0030711 A1    Feb. 2, 2012

(51) Int. Cl.
| | |
|---|---|
| *H04N 21/466* | (2011.01) |
| *G06F 17/30* | (2006.01) |
| *H04N 21/45* | (2011.01) |
| *H04N 21/482* | (2011.01) |

(52) U.S. Cl.
CPC ........ *H04N 21/466* (2013.01); *G06F 17/30268* (2013.01); *G06F 17/30274* (2013.01); *H04N 21/4532* (2013.01); *H04N 21/482* (2013.01)

(58) Field of Classification Search
CPC .............. H04N 21/482; H04N 21/466; H04N 21/4532; G06F 17/30268; G06F 17/30274
USPC ........................................................... 725/46
See application file for complete search history.

(56) References Cited

U.S. PATENT DOCUMENTS

| | | | | |
|---|---|---|---|---|
| 6,078,740 | A * | 6/2000 | DeTreville ....................... 703/22 |
| 6,687,696 | B2 * | 2/2004 | Hofmann et al. ....... 707/999.006 |
| 7,505,959 | B2 * | 3/2009 | Kaiser et al. ........... 707/999.006 |
| 8,094,948 | B2 * | 1/2012 | Jain et al. ....................... 382/225 |
| 8,782,680 | B2 * | 7/2014 | Cook et al. ....................... 725/46 |
| 2002/0083459 | A1 * | 6/2002 | Kondo et al. ................... 725/45 |
| 2002/0087987 | A1 * | 7/2002 | Dudkiewicz et al. ........... 725/46 |
| 2006/0031217 | A1 * | 2/2006 | Smith et al. ....................... 707/5 |
| 2007/0230914 | A1 * | 10/2007 | Garrido et al. .................. 386/98 |
| 2009/0113480 | A1 * | 4/2009 | Allard et al. ..................... 725/46 |
| 2009/0172030 | A1 * | 7/2009 | Schiff et al. ................ 707/104.1 |
| 2009/0327168 | A1 * | 12/2009 | Weinberger et al. ............ 706/11 |

OTHER PUBLICATIONS

Application as filed, filed on Oct. 5, 2010 (U.S. Appl. No. 12/898,644), 67 pages.
Filing receipt mailed Oct. 21, 2010 for U.S. Appl. No. 12/898,644, 3 pages.
Application as filed, filed on Oct. 5, 2010 (U.S. Appl. No. 12/898,654), 77 pages.
Notice to file corrected application papers mailed Oct. 25, 2010 for U.S. Appl. No. 12/898,654, 2 pages.
Filing receipt mailed Oct. 25, 2010 for U.S. Appl. No. 12/898,654, 3 pages.
Application as filed, filed on Oct. 5, 2010 (U.S. Appl. No. 12/898,661), 71 pages.
Notice to file corrected application papers mailed Oct. 20, 2010 for U.S. Appl. No. 12/898,661, 2 pages.
Filing receipt mailed Oct. 20, 2010 for U.S. Appl. No. 12/898,661, 3 pages.

(Continued)

*Primary Examiner* — Randy Flynn
(74) *Attorney, Agent, or Firm* — Berkeley Law & Technology Group, LLP

(57) ABSTRACT

Briefly, embodiments of a method or system of predicting media content preferences are disclosed.

21 Claims, 12 Drawing Sheets

(56) References Cited

OTHER PUBLICATIONS

Pedro, et al, "Ranking and Classifying Attractiveness of Photos in Folksonomies", WWW 2009 Madrid!, Apr. 20-24, 2009 Madrid, Spain, pp. 771-780.

Konstas, et al, "On Social Networks and Collaborative Recommendation", SIGIR 2009, Jul. 19-23, 2009, Boston MA., Copyright 2009, pp. 195-202.

Zheng, et al, "A Regression Framework for Learning Ranking Functions Using Relative Relevance Judgments", SIGIR 2007, Jul. 23-27, 2007, Amsterdam, Netherlands, Copyright 2007, pp. 287-294.

\* cited by examiner

LISTING OF 25 TEXTUAL FEATURES

| Feature | Description |
|---|---|
| tagCount | Total number of tags of given photo |
| photosTagsProb_{min, max, mean, variance} | Statistics of the photo tags w.r.t. the Flickr tag space |
| favouritesTF_{min, max, mean, stdDev, cosSim} | Statistics of tag TF values w.r.t. user's favourite photos |
| favouritesTFIDF_{min, max, mean, stdDev, cosSim} | Statistics of tag TFIDF values w.r.t. user's favourite photos |
| userUploadsTF_{min, max, mean, stdDev, cosSim} | Statistics of tag TF values w.r.t. user's uploaded photos |
| userUploadsTFIDF_{min, max, mean, stdDev, cosSim} | Statistics of tag TFIDF values w.r.t. user's uploaded photos |

*FIG. 4*

LISTING OF 39 VISUAL FEATURES

| Feature | Description |
|---:|:---|
| Orientation | Width/Height ratio |
| Size | Pixel count |
| Contrast | Score |
| RMSContrast | Score |
| Saturation | {Min, Max, Avg, StdDev} contrast values |
| Brightness | {Min, Max, Avg, StdDev} contrast values |
| Sharpness | Score |
| Colourfulness | Score |
| Sky | {Proportion, Score} of sky colours |
| Vegetation | {Proportion, Score} of vegetation colours |
| Skin | {Proportion, Score} of skin colours |
| Naturalness | Combined score of sky, veg, and skin |
| Tamura | 18 dimension texture feature |

*FIG. 5*

LISTING OF 10 SOCIAL FEATURES

| Feature | Description |
|---:|---|
| viewsCount | The number of unique occasions the photo has been viewed. |
| contactsShared | The number of contacts that both the user and the owner of the photo share. |
| isContact | Describes whether the owner of the photo is a contact of the user or not. |
| groupsShared | The number of groups of which the user and owner of the photo share membership. |
| isFriend | Describes whether the owner of the photo is labelled a 'Friend' by the user. |
| isFamily | Describes whether the owner of the photo is labelled a family member by the user. |
| photoInGroup | The number of occasions the photo appears in a group of which the user is a member. |
| commentCount | The number of comments added to the photo. |
| uniqueCommenters | The number of unique users to have commented on the photo. |
| uniqueCommentsRatio | The ratio of unique commenters to total commenters on the photo. |

*FIG. 6*

PERFORMANCE OF RANDOM SCENARIO

| System | Accuracy | Pos. prec. | Pos. rec. | Neg. prec. | Neg. rec. |
|---|---|---|---|---|---|
| Textual | 0.92 | 0.84 | 0.49 | 0.93 | 0.99 |
| Visual | 0.88 | 0.78 | 0.15 | 0.88 | 0.99 |
| Social | 0.97 | 0.94 | 0.82 | 0.97 | 0.99 |
| Textual+Visual | 0.93 | 0.88 | 0.57 | 0.94 | 0.99 |
| Textual+Social | 0.97 | 0.95 | 0.83 | 0.97 | 0.99 |
| Visual+Social | 0.98 | 0.95 | 0.91 | 0.99 | 0.99 |
| Text+Vis+Soc | 0.98 | 0.95 | 0.91 | 0.99 | 0.99 |

*FIG. 7*

PERFORMANCE OF SOCIAL RANDOM SCENARIO

| System | Accuracy | Pos. prec. | Pos. rec. | Neg. prec. | Neg. rec. |
|---|---|---|---|---|---|
| Textual | 0.87 | 0.48 | 0.18 | 0.88 | 0.97 |
| Visual | 0.88 | 1.0 | 0.085 | 0.88 | 1.0 |
| Social | 0.92 | 0.80 | 0.56 | 0.94 | 0.98 |
| Textual+Visual | 0.88 | 0.62 | 0.27 | 0.90 | 0.97 |
| Textual+Social | 0.92 | 0.77 | 0.62 | 0.94 | 0.97 |
| Visual+Social | 0.93 | 0.89 | 0.56 | 0.94 | 0.99 |
| Text+Vis+Soc | 0.93 | 0.84 | 0.62 | 0.94 | 0.98 |

*FIG. 8*

USER STATISTICS FOR POSITIVE PRECISION
USING SOCIAL RANDOM SCENARIO

| Run | Min | Max | Average | StdDev |
|---|---|---|---|---|
| Textual | 0.1 | 1.0 | 0.4985 | 0.2227 |
| Social | 0.2139 | 1.0 | 0.8270 | 0.1803 |
| Visual | 0.0 | 1.0 | 0.5 | 0.5 |

*FIG. 9*

(b) Social Random Scenario

METHOD OR SYSTEM TO PREDICT MEDIA CONTENT PREFERENCES

FIELD

This disclosure relates to a method or system to predict a user's media content preferences from among a variety of available content choices.

BACKGROUND

People may at times find it difficult to locate media content of interest. Media content may include: images, video, or audio files, for example. Paradoxically, an inability to locate media content of interest may be due at least in part to an overabundance of content, if faced with many choices; a user may abandon attempts at locating desired content. However, likewise, a shortage of content of interest to a user may be undesirable.

A content provider, including those who provide media content via the Internet, may benefit directly (e.g., by subscription) or indirectly (e.g., through advertising revenue) from having individuals access content made available. Consequently, in general, content providers desire for users to locate content of interest.

BRIEF DESCRIPTION OF DRAWINGS

Non-limiting or non-exhaustive embodiments will be described with reference to the following figures, wherein like reference numerals refer to like parts throughout the various figures unless otherwise specified.

FIG. 4 is a table of example textual features;

FIG. 5 is a table of example visual features;

FIG. 6 is a table of example social features

FIG. 7 is a table of performance results;

FIG. 8 is another table of performance results;

FIG. 9 is a table of user statistics;

DETAILED DESCRIPTION

Figure 1:
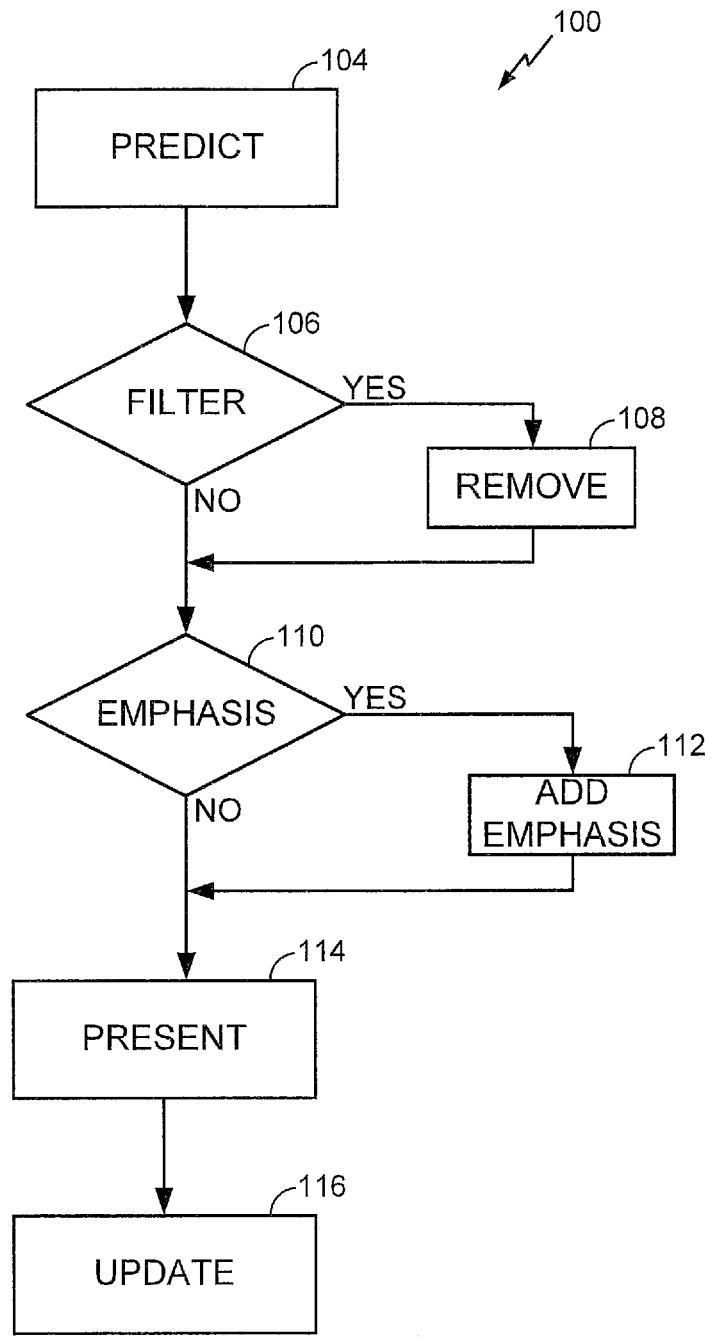
FIG. 1 is a flow chart illustrating an embodiment of a method to predict media content preferences.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that may be known by one of ordinary skill have not been described in detail so as not to obscure claimed subject matter.

Reference throughout this specification to "one embodiment" or "an embodiment" is intended to mean that a particular feature, structure, or characteristic described in connection with an embodiment may be included in at least one embodiment of claimed subject matter. Thus, appearances of the phrase "in one embodiment," "an embodiment" or the like in various places throughout this specification are not necessarily all referring to the same embodiment. Furthermore, particular features, structures, or characteristics may be combined in one or more embodiments.

Some portions of the detailed description which follows are presented in terms of algorithms or symbolic representations of operations on binary digital signals stored within a memory of a specific apparatus or special purpose computing device or platform. In the context of this particular specification, the term "specific apparatus" or the like includes a general purpose computer after it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involves physical manipulation of physical quantities. Typically, although not necessarily, quantities may take the form of electrical or magnetic signals capable of being stored, transferred, combined, compared or otherwise manipulated. It has proven convenient at times, principally for reasons of common usage, to refer to signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of a special purpose computer or similar special purpose electronic computing device.

Claimed subject matter may include any type of media content such as, for example, image, video, or audio content; however, some embodiments described below are directed toward media content in the form of images or image files without loss of generality. Use of image-related illustrative embodiments is intended in no way to limit the scope of claimed subject matter.

Social media sharing websites typically allow individuals to share a photo or image collection with others having similar interests. Users may spend hours searching, exploring or viewing photos of interest. Users might, for example, post photos to various groups, tag photos of others, provide ratings, comment on photos of interest, or mark a photo as a "Favorite." Marking a photo as a Favorite may operate as a bookmark, allowing for fast access in the future, for example. Millions of photos are typically uploaded to social media sharing websites every day. Well-known examples of social media sharing sites include the following: the Flickr® website, the Picasa Web® website and the Facebook® website.

In one embodiment, a system or method to predict media preferences may be employed to predict photos of interest to one or more users. This may, for example, be of assistance in navigating large media repositories, which are available via the Internet, for example. In accordance with claimed subject matter, in at least one embodiment, a decision process that is at least partially based on one or more statistical processes may be applied to determine a classification for media content, such as an image or photo. For example, for a decision process, such as choosing between at least two alternatives, e.g., alternative paths or courses of action, one or more statistical methods may be employed to aid in making a decision or choice between the alternatives. In this context, this is referred to as a statistical based decision process. One example, without limitation, includes a decision to classify media content, such as a photo or image, into a first category or a second category, such as of interest or not of interest. Examples of statistical methods that may be employed in a statistical based decision process include, without limitation, Naïve Bayesian processes or methods, machine learning processes, feature recognition processes, as well as others mentioned in more detail later.

In an embodiment, a system may apply machine learning or similar approaches, to predict which photos may be of interest to one or more users, for example. A classifier may apply a statistical based decision process and, therefore, may be trained using textual, social context, or aesthetic features of existing images, for example. Textual or social context features may be derived, respectively, from textual image annotations of images or from social interactions within a social image website, for example, as described in more detail below. Visual features may be derived from a variety of sources, as described in more detail below. In this particular application, the term social context or social connection refers to an aspect of an association or relationship between individuals, such as between one who has indicated an interest in particular content and one for whom a prediction is to be made. A textual feature or context refers to use of language to indicate or describe an aspect of particular content. A visual feature or context refers to an aspect of particular content that may make it pleasing to the senses, such as quality or composition, for example. Visual features for an image more specifically may include spatial features or camera features, for example.

Users may mark an image as a Favorite for textual, visual, or social context reasons, for example. As an example, a user may be interested in cats, dogs, buildings, or wildlife photography. Therefore, images related to those topics may be more likely to be labeled Favorite. Likewise, a user may be interested in art works by particular artists, such as Winslow Horner, Edward Hopper, Albert Bierstadt, or Frederick Remington. Images may be labeled as works by those artists and those images may generate interest, therefore. Friends or those in a similar social network may also have similar tastes. As a result, social context among users may be employed to predict that an image marked as a Favorite by one user may more likely be appreciated by others in the user's social network. Social context may be extended to groups of users, such as co-workers within a particular company, workers in the same or a similar field, or members of a political party, for example.

Likewise, features, such as visual, spatial, or even temporal context of an image, may be employed in prediction in at least one embodiment. Visual features, for example, may include, color, composition, or light levels, to provide only a few examples. Visual or spatial features, which may provide visual context, may be captured a variety of ways, such as by using an accepted format, such as Exchange Image File Format (EXIF), for example. Of course, claimed subject matter is not limited in scope to any illustrative examples.

Although claimed subject matter is not limited in scope in this respect, a method may employ textual, visual or social context features to predict which photos one or more users might consider to be of interest. Specific features, such as textual or social context, may be derived from a social image sharing website, for example, as described in more detail below. Visual features may generally include spatial, or temporal context, as mentioned previously.

In at least one embodiment, a classifier may be produced, in accordance with machine learning or similar approaches, for example, by using textual, media-specific visual (image-specific, in following examples), or social context information related to one or more images. For example, as suggested previously, a classifier may be trained using textual, media-specific, or social context information, as described in more detail below.

A training process may employ textual, social context, or visual features of images for training. Training may be user-specific or not user-specific and may entail extracting features from favorite or non-favorite images. For example, if a user selects an image as a Favorite, a label indicating Favorite status may be stored. A text label or tag may therefore indicate status, and may be used as a positive example for training of a classifier, for example. Negative examples used to train a classifier may in contrast, for example, have been labeled as not of interest, or disfavored, by a user. Images that have been viewed by a user, but not selected as Favorites, may also be used as negative examples in an embodiment. Features may be extracted from images employed as positive or negative image examples for training. As suggested, in an embodiment, features may include textual, visual, or social context, for example. A classifier may be trained using selected features to distinguish or classify images.

Claimed subject matter is not limited in scope to a particular training process. Various potential embodiments are described below; however, these example embodiments are provided merely as illustrative examples and are not intended to limit claimed subject matter. Furthermore, specific examples of an approach employed in an embodiment are described in detail later.

Predicting whether a user will indicate an unseen photo to be a favorite may be treated as a classification task. One approach in at least one embodiment may therefore be to apply a stochastic gradient boosted decision tree (GBDT) methodology. A GBDT methodology or approach is one employed at times in the field of machine learning. Of course, other approaches from the field of machine learning may be applied in addition to or instead of a GBDT approach. GBDT is described, for example, in J. H. Friedman. *Greedy function approximation: A gradient boosting machine*, appearing in The Annals of Statistics, 29 (5), October 2001. Gradient tree boosting constructs an additive regression model, using decision trees as weak learners. GBDT may be adaptable and different loss functions can be used during boosting. Least squares regression, for example, may be employed as a loss function. Likewise, as an alternative to GBDT least one embodiment may employ a J4.8 decision tree as a classifier, for example. A J4.8 decision tree, for example, is discussed in: J. R. Quinlan, *Induction of decision trees*, Machine Learning, March, 1988; I. H. Witten and E. Frank, Data Mining: Practical Machine Learning, Tools and Techniques; and Morgan Kaufmann, Series in Data Management Systems, second edition, June 2005. Alternatively, a multi-layered perceptron or support vector machine, for example, may be employed as a classifier. Of course, these are merely examples and claimed subject matter is not limited in scope to these examples.

Favorite images may tend to be visually pleasing, e.g., sharp, high quality, etc. Also, users may focus on a small number of topics of interest, like children, cityscape, nature, or portraits. Likewise, favorite photos may be posted in a group a user is subscribed to, or was taken by a contact in a user's social network. Therefore, visual features may be dependent at least in part on the photo. Social features may depend at least in part on the user. Textual features may be derived from tags associated with a photo, tag vocabulary used by a user to annotate their photos or tag vocabulary formed by photos that were called a favorite by a user. Textual features, therefore, may depend at least in part both on photo and context of a user in at least one embodiment.

Images may be obtained by mining records of previous behavior in which images, for example, are tagged in some way to indicate some as having been of interest. Information to be used in this matter may, for example, be stored at an online social or photo sharing website. A user need not give any explanation as to why a particular image is preferred, typically. Extracted features may be related to textual or social context, for example. Likewise, visual or image-related features may also be extracted. Visual features may include: color layout descriptor, dominant color descriptor, color or edge directivity descriptor, or edge histogram, for example. Other categories of visual features may include temporal or geographical features, for example, may also be employed.

Features of non-favored images may also be employed for training. Images may, for example, be identified by a user, for example, as disfavored images. Gradations in favored or non-favored status are possible and intended to be included with the scope of claimed subject matter. For example, a user may label an image on a scale to provide a more precise measure of interest. In an embodiment in which a user has not tagged disfavored images, images that have been viewed by a user but not marked as favored may likewise be presumed to be disfavored. Favored or disfavored images may also be garnered from images that social contacts have viewed. Social contacts may, for example, comprise contacts with whom a user interacts on a social website, via email, via twitter or through some other association, for example. Likewise, in at least one embodiment, it may be desirable to omit images that have been viewed a relatively small number of times by a contact or by a user. In an embodiment, as previously suggested, features for training may include: textual, visual, or social context features. Of course, other feature types may also be employed.

Textual information produced by a user, such as photo tags, for example, may be used for training in a variety of ways. Examples, without limitation, may include: minimum, maximum, mean, or standard deviation of a tag frequency value for a tag; minimum, maximum, mean, variance, or standard deviation of term-frequency inverse document frequency (TF-IDF) value for a tag; cosine similarity of a vector of term frequency values of tags for an image, a vector of term frequency values of tags employed by a user and a vector of term frequency values of tags of a user's favorite images; cosine similarity of a vector of TF-IDF values of tags of an image, a vector of TF-IDF values of tags used by a user, and a vector of TF-IDF values of tags of a user's favorite images; or number of tags use to annotate an image.

As suggested, visual features for training may include: color layout, dominant color, scalable color, color histogram, color autocorrelogram, color or edge directivity descriptor (CEDD), or Tamura texture features. Extraction of features may generate a histogram or other set of values for training of a classifier. For example, minimum value, maximum value, mean, standard deviation or kurtosis may be used to represent histogram values.

Visual features may be employed to capture visual aesthetics or quality of images. A set of low-dimensional image features may be employed to describe attributes that encapsulate human perception, rather than high dimension features like color histogram, edge directionality (CEDD), or other well known global image features. An example set of visual features is outlined in FIG. 5. Claimed subject matter is not limited to these features, of course.

As an example, two image geometry features may be employed. One may comprise an orientation feature to indicate whether an image is laid out as a portrait or landscape. Another may comprise a size feature to allow for differentiation between high resolution images, such as those taken with cameras of potentially higher quality, and low resolution images, such as those taken with smaller sized cameras or other mobile devices.

As another example, two types of contrast features may be employed, referred to as Contrast and normalized Root Mean Square (RMS) Contrast. Contrast may comprise an HSL representation of an image and an average distance between pixel luminance and an average luminance:

$$C = \frac{1}{N}\sum_{x,y}(l_{x,y} - \overline{L})$$

Likewise, CRMS may be calculated using the following relations:

$$\overline{L} = \frac{1}{N}\sum_{x,y}\frac{l_{x,y} - l_{min}}{l_{max} - l_{min}}$$

$$C_{RMS} = \sqrt{\frac{1}{N}\sum_{x,y}(l_{x,y} - \overline{L})^2}$$

Continuing with examples, saturation, brightness and colorfulness features may be employed to describe color characteristics of an image in terms of minimum, average, maximum and standard deviation of vividness and luminance, and a score for difference-from-grey respectively. Saturation may, for example, be calculated as follows:

$$Sa = \max(R,G,B) - \min(R,G,B)$$

where R, G and B comprise color values in the sRGB color space.

Brightness may be captured as average intensity of pixels in an image. Using a color space that encodes luminance, its calculation in the YUV color space may comprise a mean value:

$$\overline{Y} = \frac{1}{N}\sum_{x,y}(Y_{xy})$$

where Yxy describes the luminance value for a pixel at coordinates x, y and N is number of pixels.

Sharpness may measure coarseness of an image and may be calculated as a function of its Laplacian, using normalized local average luminance with respect to surrounding pixels:

$$Sh = \sum_{x,y}\frac{L(x,y)}{\mu_{x,y}}$$

-continued $$L(x, y) = \frac{\partial^2 I}{\partial x^2} + \frac{\partial^2 I}{\partial y^2}$$

where $\mu_{x,y}$ is the average luminance of the pixels around pixel of coordinates x; y. Likewise, colorfulness may be extracted in the sRGB color space using a derivative opponent color space denoted as:

$rg=R-G$ $yb=\frac{1}{2}(R+G)-B$

Colorfulness may be calculated as:

$Cf=\sigma_{rgyb}+0.3\cdot\mu_{rgyb}$ $\sigma_{rgyb}=\sqrt{\sigma_{rg}^2+\sigma_{yb}^2}$ $\mu_{rgyb}=\sqrt{\mu_{rg}^2+\mu_{yb}^2}$ A naturalness feature may combine multiple aspects of visual perception of an image including colorfulness and dynamic range into a single score. This score may be made up of three constituent parts representing a proportion of pixels expected to be either skin, vegetation or sky. Using the HSL color space, pixels may be filtered for those that have values 20<L>80 and S>0:1. Remaining pixels may be grouped in 3 sets: Skin, Grass and Sky. Average saturation for a group may be used to compute a naturalness index:

$$N_{Skin} = e^{-0.5\left(\frac{\mu_S^{Skin}-0.76}{0.52}\right)^2}, \text{ if } 25 \leq \text{hue} \leq 70$$

$$N_{Grass} = e^{-0.5\left(\frac{\mu_S^{Grass}-0.81}{0.53}\right)^2}, \text{ if } 95 \leq \text{hue} \leq 135$$

$$N_{Sky} = e^{-0.5\left(\frac{\mu_S^{Sky}-0.43}{0.22}\right)^2}, \text{ if } 185 \leq \text{hue} \leq 260$$

These may then be combined to form a score:

$$N = \sum_i \omega_i N_i, \ i \in \{\text{'Skin', 'Grass', 'Sky'}\}$$

where $\omega_i$ is the proportion of pixels in group i. Scores for the three pixel groups as well as the overall naturalness score may be employed as example features. Likewise, proportions within an image may also be employed.

Tamura features may be employed to characterize texture of an image using coarseness, contrast and directionality, as described in the work of Tamura et al., *Textural features corresponding to visual perception* appearing in Systems, Man and Cybernetics, IEEE Transactions on, 8 (6):460-473, 1978. Coarseness and contrast may be represented as single values whereas directionality may comprise a 16 bin histogram.

Likewise, visual features may comprise globally captured features in terms of color, texture, or shape as well as local features to allow for detecting near duplicates or particular visual object representations that are depicted in an image.

Extracted social features may also be employed for training of a classifier. Social relationships among users may include categories, such as, contacts, friends, or family, for example, but may be extended to co-worker, membership in various groups, such as professional associations, or other relationships.

Social context features may include: a measure of social interaction, such as number of tags associated with an image; number of occasions in which an image has been viewed; number of contacts shared by an owner and viewer of an image; whether an owner of an image is a contact of a user viewing an image and, if so, whether a label is used to annotate a relationship between viewer and owner; number of occasions an image appears in a group of which a user is a member; number of comments associated with an image; number of unique commentators associated with an image; ratio of unique to total commentators associated with an image; or number of groups that both an owner and a viewer of an image share.

Camera visual features may include information about an image and state of a camera that produced the image. Information may include: shutter speed, aperture size, whether a flash is used, or other photographic information, for example. Any of a variety of descriptor schemes, including MPEG-7, may be employed. An overview of a descriptor scheme may be viewed, for example, at the following web address: http://www.chiariglione.org/mpeg/standards/mpeg-7/mpeg-7.htm.

FIG. 1 is a flow chart illustrating a process embodiment 100. It should be noted that in an alternate embodiment operations may be performed in an order other than as described or shown. Likewise, operations may be omitted or other operations may be added. Embodiment 100 assumes a classifier has been trained. As previously noted, although example embodiments refer to images or image preferences, various types of media content, including images, video streams, or audio streams, for example, are also contemplated in alternative embodiments. In at least one embodiment, prediction by a classifier may be related to an individual or to a group of individuals. For example, a classifier may be applied to textual, social, or image-specific visual features extracted from image content to predict whether the image content is more likely to be of interest to an individual or group of individuals.

Referring to FIG. 1, an embodiment 100 may proceed to block 104 where a classifier may make a determination or prediction that a candidate image may be of more interest to one or more users, for example. For example and without limitation, in at least one particular embodiment, prediction of a photo being relevant to a given user, may depend at least in part on at least one or any combination of the following: matching topical interest of a user with textual annotations of a photo; annotations of a photo independent of user topical interest, content based features preferred or specifically not preferred by a user; matching features of a photo, and features of past favorites of a user; or social connection between a photo (or its owner) and a user. In an embodiment, a candidate image may comprise an image never before seen, viewed, experienced, played, etc. by the one or more users. In this context, media content or a media type experienced previously by a user, such as an image, video or audio, is referred to generally as having been presented to the user. Likewise, in at least one embodiment, a candidate image may also include an image previously presented to a user which was not tagged by the user, for example.

Details for at least one embodiment regarding making a determination or prediction with respect to media content, such as an image, is described in more detail below. However, aspects described regarding producing a determination or prediction are not meant to be limited to a particular embodiment. For example, an image may be found to fall within some range of probability identified as being a range indicating some interest to one or more users, which may, for example, in at least one embodiment, comprise a threshold probability, represented by a score or other derived value.

However, claimed subject matter is not limited in scope to employing a particular threshold or probability range. For example, in at least one embodiment, a classifier may indicate a prediction without necessarily providing a value or score.

From block 104, a process embodiment, such as 100, for example, may proceed to block 106, where it is determined whether candidate images are to be filtered or otherwise selected before presentation to one or more users. If images are to be filtered embodiment 100 proceeds to block 108 where images determined to not be of interest based at least in part on application of a classifier, for example, may be removed from a set of images to be presented to one or more users.

A process embodiment may proceed to block 110 where it is determined whether or not images are to be presented to a user with emphasis. If emphasis is to be employed, a process embodiment may proceed to block 112 where emphasis may be added to an image to indicate results of a determination made at block 104, for example. Depending at least in part on details with respect to an embodiment, an indication may comprise a positive or negative indication. Any variety of cues: audio, video, textual, graphical, or iconic, for example, may be employed to convey a determination or prediction. For example, an image that has been determined or predicted to be more desirable may be enlarged or an image determined or predicted to be less desirable may be shrunk or reduced in size. Likewise, flashing, varying a rate of flashing, highlighting, underlining, or other graphical techniques may also be employed for emphasis, for example. Claimed subject matter is not limited in scope to a particular approach regarding how to convey emphasis.

A process embodiment may proceed to block 114. One or more images may therefore be presented to one or more users. Therefore, predictions may be applied by a classifier to particular users or may be applied to a group of users. Of course, visual, social or textual features to capture the interests of the group may be appropriate for a classifier applied to a group.

Presentation may take a variety of forms and claimed subject matter is not limited in scope to a particular approach. For example, a presentation may comprise a sequential stream of images or a batch of images through which one or more users may shuffle, sift or browse, for example. One or more users may browse through images in any order or manner, moving "forward" or "backward" in sequence, or picking from a "pile," (that is, an overlapped display of partial images) or array of images, for example. Likewise, images may be presented with or without emphasis and may be filtered or not filtered, as described previously. In at least one embodiment, for example, an indication may be provided to a user that an image may be of interest in accordance with a prediction, for example. An indication may comprise a visual or audio cue. In another embodiment, images that a classifier determines less likely to be of interest to a user may be filtered or omitted from presentation.

A process embodiment, such as 100, may proceed to block 116 where one or more users may rate or otherwise tag one or more images presented at block 114. A classifier may be updated periodically. As one example, without limitation, an online learning may be applied to do this incrementally for individual users or groups, for example. Of course, in an alternate embodiment, rating or tagging may be omitted. However, if one or more users rate or tag one or more images, as indicated at block 116, a classifier may be updated with the rating or tagging provided. An approach to updating of a classifier may depend at least in part on particular details regarding a statistical based decision process employed or applied. It is believed not necessary to provide specific details regarding how updating of a classifier may take place. In general, however, a classifier may be updated through a process that may involve retraining.

Figure 2:
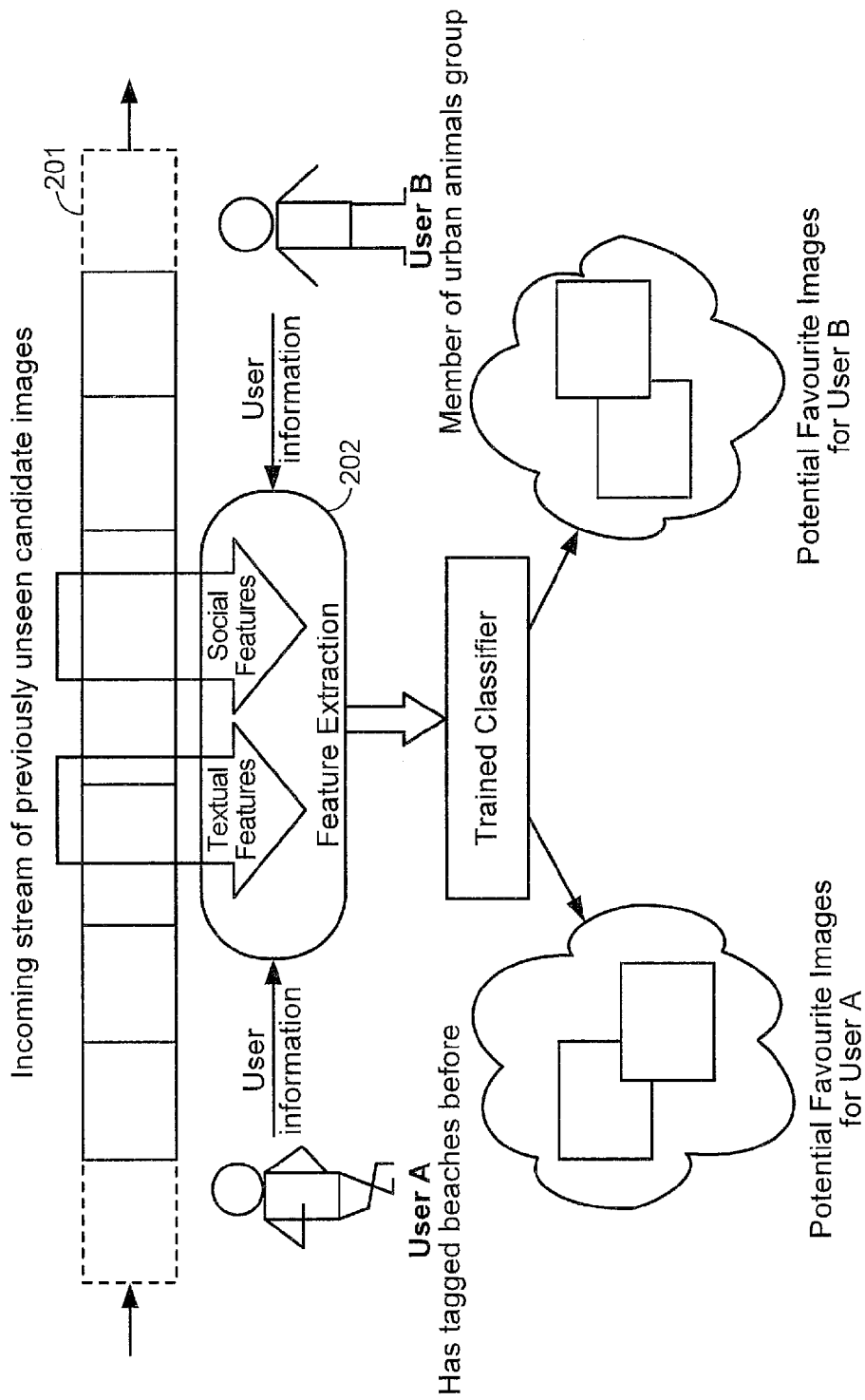
FIG. 2 is a schematic diagram illustrating an embodiment of a system to predict media content preferences.

In at least one embodiment, as described above, one or more users' image preferences may be predicted by supplying to a classifier feature information, such as textual, visual or social context feature information. Textual information, for example, related to photo annotations, such as tags, may be attached to images. For example, an image annotation may indicate a topic of an image. Social context information may be correlated with an indication from a user that he or she belongs to a certain family, for example. Therefore, referring to FIG. 2, an image stream 201 may be generated, for example, by a user's browsing of a social image website. Stream 201 may include candidate images, for example, that have not previously been viewed by a user. Information from a user, such as A or B, for example, may be supplied so that a prediction or determination may be made. A candidate image 202 may be in a stream 201 or in a batch of images available through the Internet, for example. Visual, textual, or social features of candidate image 202 may be employed to make a prediction regarding whether user A will find candidate image 202 of interest. If so, candidate image 202 may be presented to user A. Candidate image 202 may be emphasized in some manner to draw user A's attention, for example. Candidate image 202, or an icon associated with candidate image 202, for example, may be highlighted, underlined, colored brightly, flashed, or otherwise given attention-drawing attributes. Correspondingly, if candidate image 202 is not predicted to be of interest, it may be omitted or removed from images presented to user A. A user may, therefore, in at least one embodiment be presented with a reasonably concise set of results, thereby reducing burden during a search, for example.

Although an embodiment may comprise a classifier for any user, a group- or individual-classifier is also contemplated within the scope of claimed subject matter. Depending at least in part on details of a particular embodiment, a classifier may be applied to a select group of users, to individual users or to a group intended to include any user. In an embodiment in which a classifier is intended to be for any user, the classifier may make predictions for a user, even if a particular user has marked or tagged few images, or no images. If a particular user has marked or tagged few images, or no images, a prediction may use textual information of an image. Likewise, as a user begins to interact, a growing body of social context information for the user may improve predication accuracy.

Likewise, a classifier may be applied to a group of users, rather than to individual users. A classifier intended to reflect preferences for an individual may more conveniently weigh recent information more heavily than older information, for example, so that passage of time may be included in making predictions. Additionally, a user's change in taste over time may be accommodated. While a unique classifier per user may yield greater accuracy in predicting which candidate images might be of interest, likewise, a classifier for a group of individuals may be employed to adjust as time passes as well. In at least one embodiment, a classifier may be, in effect, 'tuned' to take into account a trade off between false positives and false negatives. For example, too many false positives may discourage a user (e.g., images may be predicted to be of interest that turn out to not be of interest); however, too many false negatives may result in loss of interest for failure to identify enough content of interest for a user.

As discussed previously, a training process may employ positive and negative examples of features gathered from images loaded into an image social website database, for example. An illustrative example of features used to train a classifier is discussed below in detail; however, claimed subject matter is not limited in any way to this particular example. Details regarding this example are provided only for purposes of illustration.

In this illustrative example, textual and social features drawn from one positive and two negative sets of information are employed to train a classifier. Here, in this example, a positive set of information to train a classifier may be drawn from a group of users who have labeled a relatively large number of images as Favorites. One negative set of information, referred to herein as "Random," comprises randomly selected from images associated with an image social website that have not been selected as Favorites. Another set of negative examples of features is obtained in this example by randomly selecting from an aggregation of images associated with a user's contacts, excluding images labeled as Favorite by the user. This latter set of information may be referred to herein as a "Social Random" set of information. A Social Random set of information may reflect a set corresponding to images a user might encounter from interactions or sharing with others, for example. In this illustrative example, textual and social features may be evaluated for information gain associated with a feature. This evaluation may affect whether to include a feature in a training process in the future.

Figure 3:
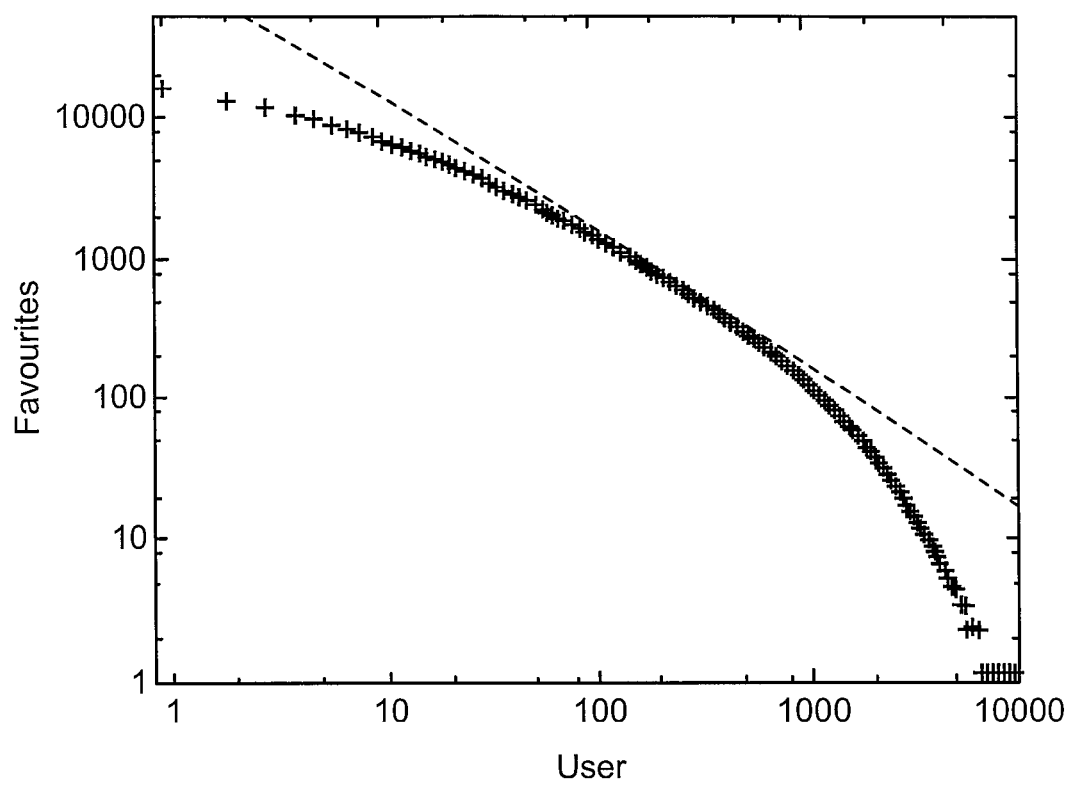
FIG. 3 is a graph illustrating a sampled distribution of number of favorites per user.

Rather than employing all or most images within a social image website to train a classifier, a representative subset may be employed. A graph provided in FIG. 3 illustrates a sampled distribution of the number of Favorites per user for users of the Flickr® website who use Favorites, for example. The graph is provided on a log-log scale. The x-axis represents ten thousand users, equally sampled from an ordered list of Flickr® website users that have collected Favorite photos, sorted by descending number of Favorites. The y-axis refers to the number of Favorites a user has labeled. The distribution is modeled by a power law with the probability of a user having Favorites frequency x being proportional to $x^{-0.976}$.

As indicated by the graph, around 40% of users have labeled photos as Favorites at least 10 times and around 10% of users have labeled photos as Favorites over 100 times. A classifier may be trained using this information which may reflect user patterns.

A classifier may be trained, for example, from a group of one hundred users selected at random from among those that have labeled at least one hundred photos as Favorite. Images uploaded by this group, for example, totaled 44,322 images. A negative example set of information may include photos randomly selected from throughout the Flickr® website that have not been labeled as a Favorite by any of the one hundred users whose photos formed a positive set. This latter set may be referred to herein as a "completely random" set and, in this illustrative example, includes 288,139 images, yielding a positive-to-negative example ratio of approximately 1:6.5 here. This ratio for this example may be considered here to provide a realistic representation of use of the Favorite option. As suggested, another negative example set may be formed by aggregating contacts of the one hundred users, gathering images of the contacts by randomly selected enough of the images to maintain a 1:6.5 ratio of positive to negative examples. After developing positive and negative sets, textual visual and social features may be extracted from images within the sets. The various features, textual, visual and social, are listed in FIGS. 4 to 6. A classifier may be trained using these example sets.

Here, for example, tags extracted from images may be employed as textual features. Vector representations of term frequency (TF) and term frequency-inverse document frequency (TF-IDF) values for tags may be determined. TF-IDF, for example, comprises a statistical measure used to evaluate relative significance of a term in a collection of documents. In a scheme employing TF-IDF, significance of a term is considered proportional to the number of times the term appears in a selected item from a collection, offset by the number of times the term appears in the collection. Textual features may be derived from an aggregation of images a user has labeled as a Favorite, which may reflect textual interests of a user. Additionally, textual features may be derived from an aggregation of a user's uploaded photos. An aggregation may reflect the type of tagging a particular user tends to exhibit. Cosine similarity of an image's vector compared with aggregate vectors may provide an indication of how well a prospective image matches a user's interests. Social connection or social context features may reflect connections between: an image and a user, an image and its owner, or between an image and other users, for example.

To evaluate performance, various combinations of features may be applied to two sets of sample information referred to as Random and Social Random. For example, seven combinations are arranged as follows:

Textual run. GBDT model trained with the 25 textual features listed in FIG. 4.

Visual run. GBDT model trained with the 38 visual features listing in FIG. 5.

Social run. GBDT model trained with the 10 social features listed in FIG. 6.

Textual+Visual run. Textual and visual features have been used to train the GBDT.

Textual+Social run. Textual and social features have been used to train the GBDT.

Visual+Social run. Visual and social features have been used to train the GBDT.

Text+Vis+Soc run. Feature space of FIGS. 4-6 is used to train the GBDT model.

Metrics for evaluation of prediction performance, such as the following, may be applied to evaluate the ability to predict a photo as a favorite (positive/negative) and its conditional state (true/false):

Accuracy: Ratio of Correct Predictions Over all Predictions:

$$\text{Accuracy} = \frac{\text{true positive} + \text{true negative}}{\text{all predictions}}$$

Positive/negative precision: Ratio of correctly predicted favorites, or non-favorites. Below is positive precision.

$$\textit{Pos. precision} = \frac{\text{true positive}}{\text{true positive} + \text{false positive}}$$

Positive/negative recall: Proportion of correctly classified predictions, positive or negative.

$$\textit{Pos. recall} = \frac{\text{true positive}}{\text{true positive} + \text{false negative}}$$

FIG. 7 shows overall performance in accordance with these example metrics of the 7 runs above on the so-called Random set. The various approaches perform well in terms of accuracy and positive recall. As one may expect, prediction of the Visual run does not perform as well as the others. Likewise, runs employing social features appear to outperform runs that do not. FIG. 8 presents the results on the Social Random set. Good performance in terms of accuracy is achieved for both the Visual+Social run and the Text+Vis+Soc run.

FIG. 9 presents the minimum, maximum, mean and standard deviation of the positive precision per user, split by the 3 types of features. A large diversity in terms of prediction performance across the different users appears to be present.

FIG. 10 shows relative importance of the top 25 features of the GBDT models using all features for both scenarios. The relative importance is calculated using the method as described in the work of Friedman et al., *Greedy function approximation: A gradient boosting machine* appearing in The Annals of Statistics, 29 (5), October 2001. We focus our analysis on the top 25 features.

Figure 10A:
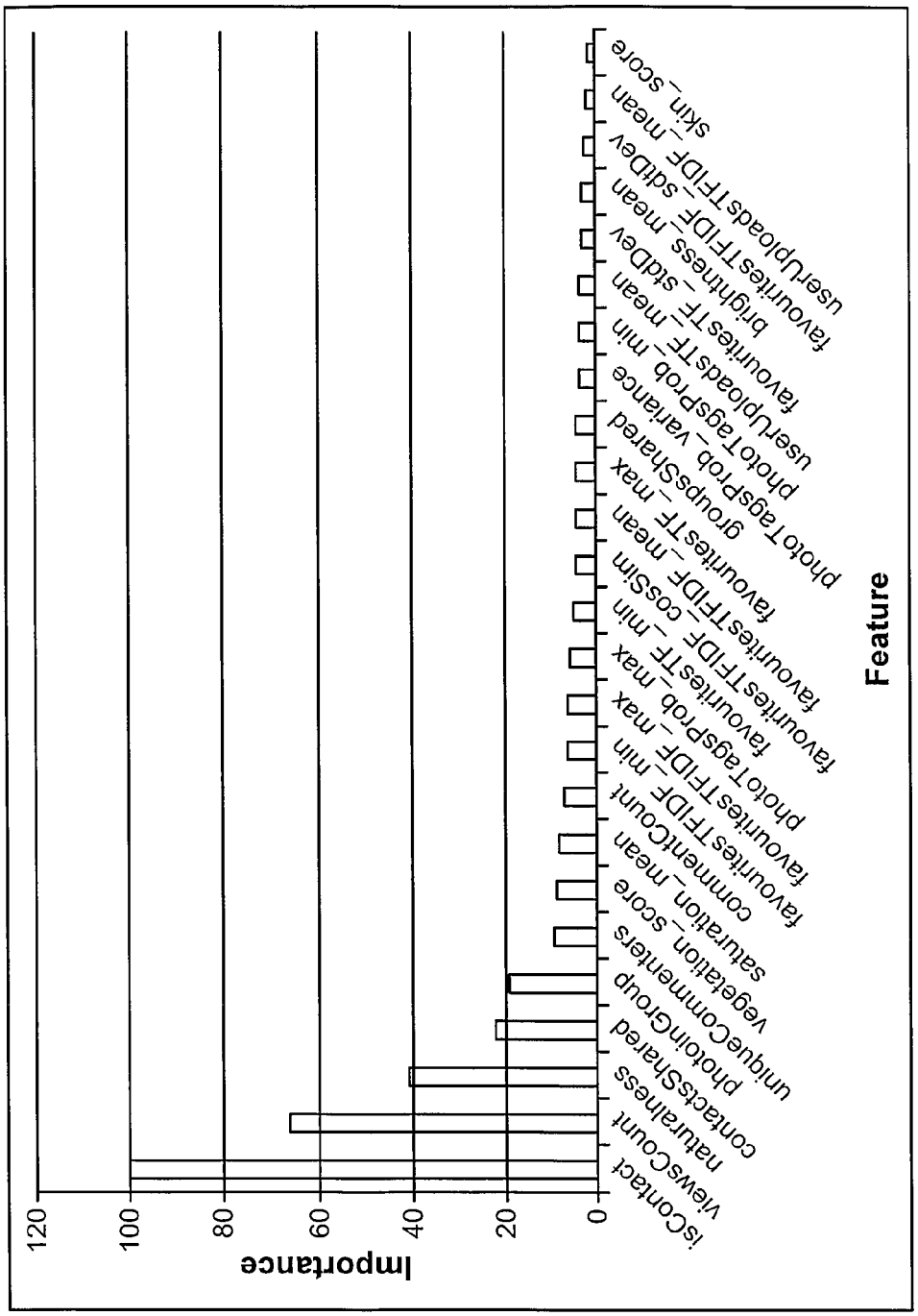
FIG. 10 are plots of features determined to be useful for prediction using two sets of samples.
Figure 10B:
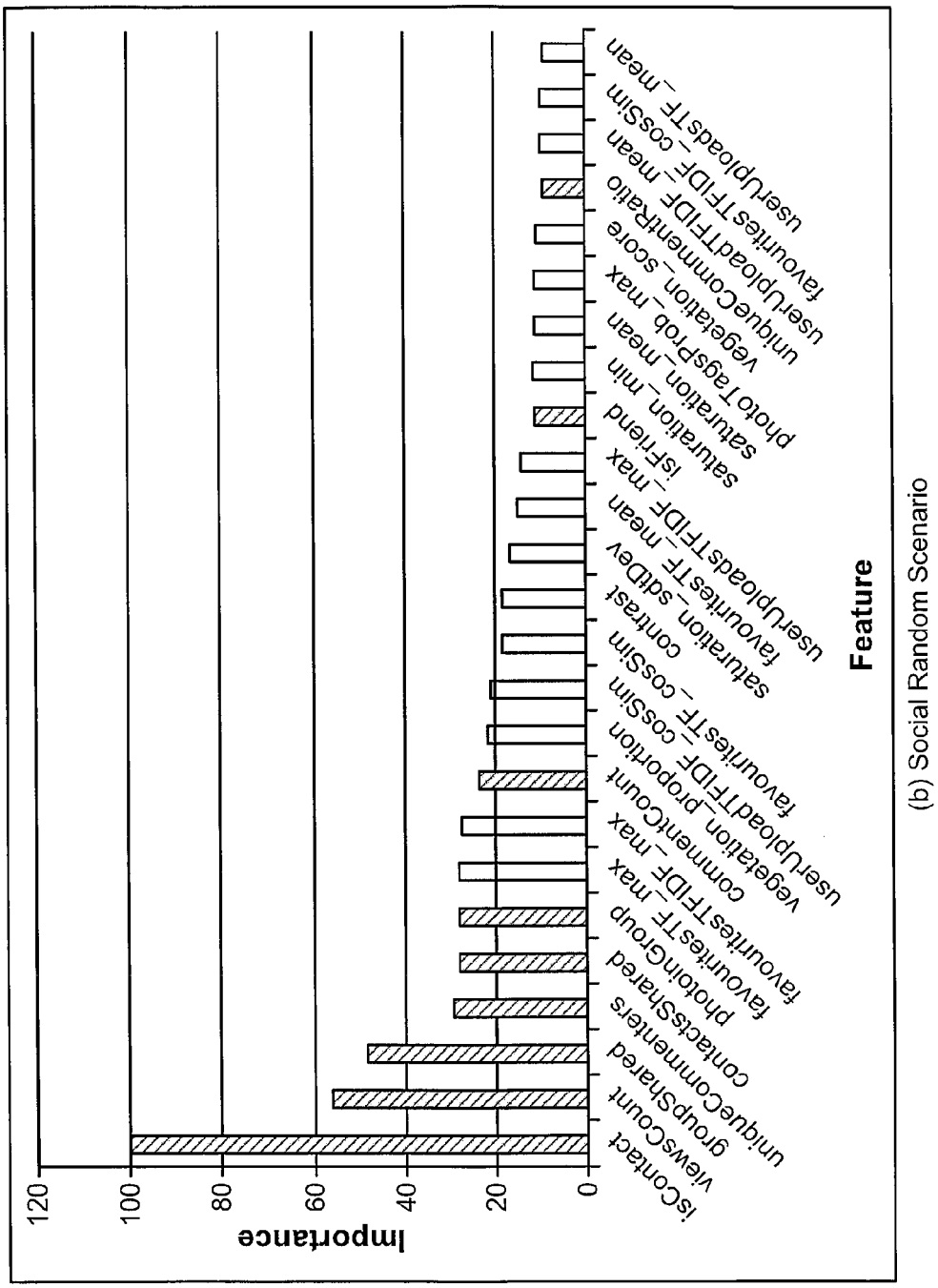

For the features in FIG. 10(a), the initial 3 features (is Contact, viewsCount and naturalness) account for 50% of the cumulative total. Two of these are social features and the third is visual. In contrast, in FIG. 10(b) we see that 50% of the cumulative total is spread over the initial 10 features. Social features appear to dominate once more. The top two feature are common between the scenarios.

Figure 11:
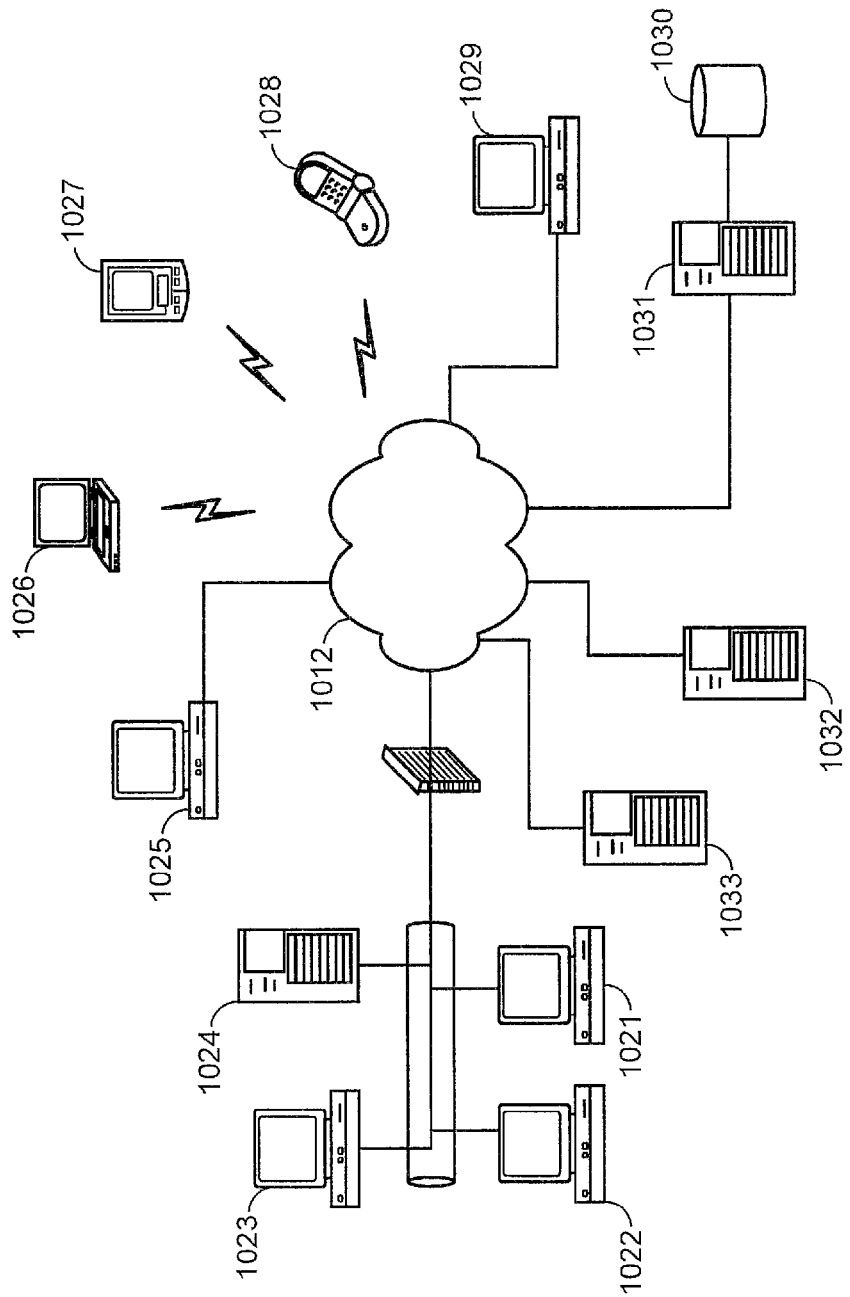
FIG. 11 is a schematic diagram illustrating an embodiment of a typical network of computing and communication devices.

It will, of course, be understood that, although particular embodiments have just been described, claimed subject matter is not limited in scope to a particular embodiment or implementation. For example, one embodiment may be in hardware, such as implemented on a device or combination of devices, as previously described, for example. For example, FIG. 11 illustrates an embodiment of a network 1012 that may employ one or more embodiments, such as 1021, 1022, 1023, 1024, 1025, 1026, 1027, 1028, 1029, 1030, 1031, 1032, and 1033. Likewise, although the claimed subject matter is not limited in scope in this respect, one embodiment may comprise one or more articles, such as a storage medium or storage media, as described above for example, that may have stored thereon instructions that if executed by a specific or special purpose system or apparatus, for example, may result in an embodiment of a method in accordance with claimed subject matter being executed, such as one of the embodiments previously described, for example. As one potential example, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, the claimed subject matter is not limited in scope to this example.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

The invention claimed is:

1. A method comprising:
    employing, by one or more processors, one or more binary digital signals comprising a classification scheme to media content with respect to a particular user of a plurality of users, the classification scheme being based at least in part on:
        textual features of the media content;
        a measurement of social interaction between the particular user and individual ones of the plurality of users to whom the media content has been presented, the measurement of social interaction being based, at least in part, on a determination whether the particular user comprises a social contact of an owner of the media content or a number of social contacts shared by the owner of the media content and the particular user; and
        a time-weighted determination of whether one or more items of the media content are favored by the individual ones of the plurality of users; and
    predicting, by the one or more processors, one or more binary digital signals comprising media content preferences of the particular user based, at least in part, on the classification scheme.

2. The method of claim 1, wherein the media content comprises one or more images.

3. The method of claim 2, wherein the individual ones of the plurality of users to whom the media content has been presented have indicated the one or more images are favored or disfavored.

4. The method of claim 3, wherein the classification scheme with respect to the individual ones of the plurality of users is further based at least in part on visual context and camera context.

5. The method of claim 1, and further comprising generating, by the one or more processors, one or more binary digital signals comprising a confidence rating on the media content classification.

6. The method of claim 1, the classification scheme being derived using one or more statistical type decision processes.

7. The method of claim 6, wherein the one or more statistical type decision processes comprises one or more machine learning techniques.

8. The method of claim 7, wherein said one or more machine learning techniques includes a decision tree-type process.

9. An article comprising:
    a non-transitory storage medium having stored thereon instructions executable by a special purpose computing platform to:
        employ one or more binary digital signals comprising a classification scheme to media content with respect to a particular user of a plurality of users;
    the classification scheme to be based at least in part on:
        textual features of the media content;
        a measurement of social interaction between the particular user and individual ones of the plurality of users to whom the media content has been presented, the measurement of social interaction to be based, at least in part, on a determination whether the particular user comprises a social contact of an owner of the media content or a number of social contacts shared by the owner of the media content and the particular user; and
        a time-weighted determination of whether one or more items of the media content are favored by the individual ones of the plurality of users; and
    predict one or more binary digital signals comprising media content preferences of the particular user to be based, at least in part, on the classification scheme.

10. The article of claim 9, wherein the media content is to comprise one or more images.

11. The article of claim 10, wherein said storage medium further having stored thereon instructions executable by a special purpose computing platform to employ one or more binary digital signals comprising a classification scheme with respect to the individual ones of the plurality of users to whom the one or more images has been presented and wherein the one or more users have indicated the one or more images are favored or disfavored.

12. The article of claim 11, wherein the classification scheme with respect to individual ones of the plurality of users is further based at least in part on visual context and camera context.

13. The article of claim 9, wherein the classification scheme is to be derived using one or more statistical based decision processes.

14. The article of claim 13, wherein the one or more statistical based decision processes is to comprise one or more machine learning techniques.

15. The article of claim 14, wherein said one or more machine learning techniques includes a decision tree-type process.

16. An apparatus comprising:
a special purpose computing platform, wherein the special purpose computing platform is capable of:
employing one or more binary digital signals comprising a classification scheme to media content with respect to a particular user of a plurality of users
the classification scheme to be based at least in part on:
textual features of the media content;
a measurement of social interaction between the particular user and individual ones of the plurality of users to whom the media content has been presented, the measurement of social interaction being based, at least in part, on a determination whether the particular user comprises a social contact of an owner of the media content or a number of social contacts shared by the owner of the media content and the particular user; and
a time-weighted determination of whether one or more items of the media content are favored by the individual ones of the plurality of users; and
predict one or more binary digital signals comprising media content preferences of the particular user based, at least in part, on the classification scheme.

17. The apparatus of claim 16, wherein the media content is to comprise one or more images.

18. The apparatus of claim 17, wherein the special purpose computing platform is further capable of employing one or more binary digital signals comprising a classification scheme with respect to the individual ones of the plurality of users to whom the one or more images has been presented;
wherein the one or more users have either indicated the one or more images are favored or disfavored.

19. An apparatus comprising:
means for computing including means for employing one or more binary digital signals comprising a classification scheme to media content with respect to a particular user of a plurality of users;
the classification scheme to be based at least in part on:
textual features of the media content;
a measurement of social interaction between the particular user and individual ones of the plurality of users to whom the media content has been presented, the measurement of social interaction being based, at least in part, on a determination whether the particular user comprises a social contact of an owner of the media content or a number of social contacts shared by the owner of the media content and the particular user; and
a time-weighted determination of whether one or more items of the media content are favored by the individual ones of the plurality of users;
means for predicting one or more binary digital signals comprising media content preferences of the particular user based, at least in part, on the classification scheme.

20. The apparatus of claim 19, wherein the media content is to comprise one or more images.

21. The apparatus of claim 20, wherein the individual ones of the plurality of users have either indicated the one or more images are favored or disfavored.

* * * * *